Oct. 31, 1939.  M. B. OSCHERWITZ ET AL  2,177,784
AUTOMATIC CUT-OFF DEVICE
Filed March 21, 1938  2 Sheets-Sheet 1
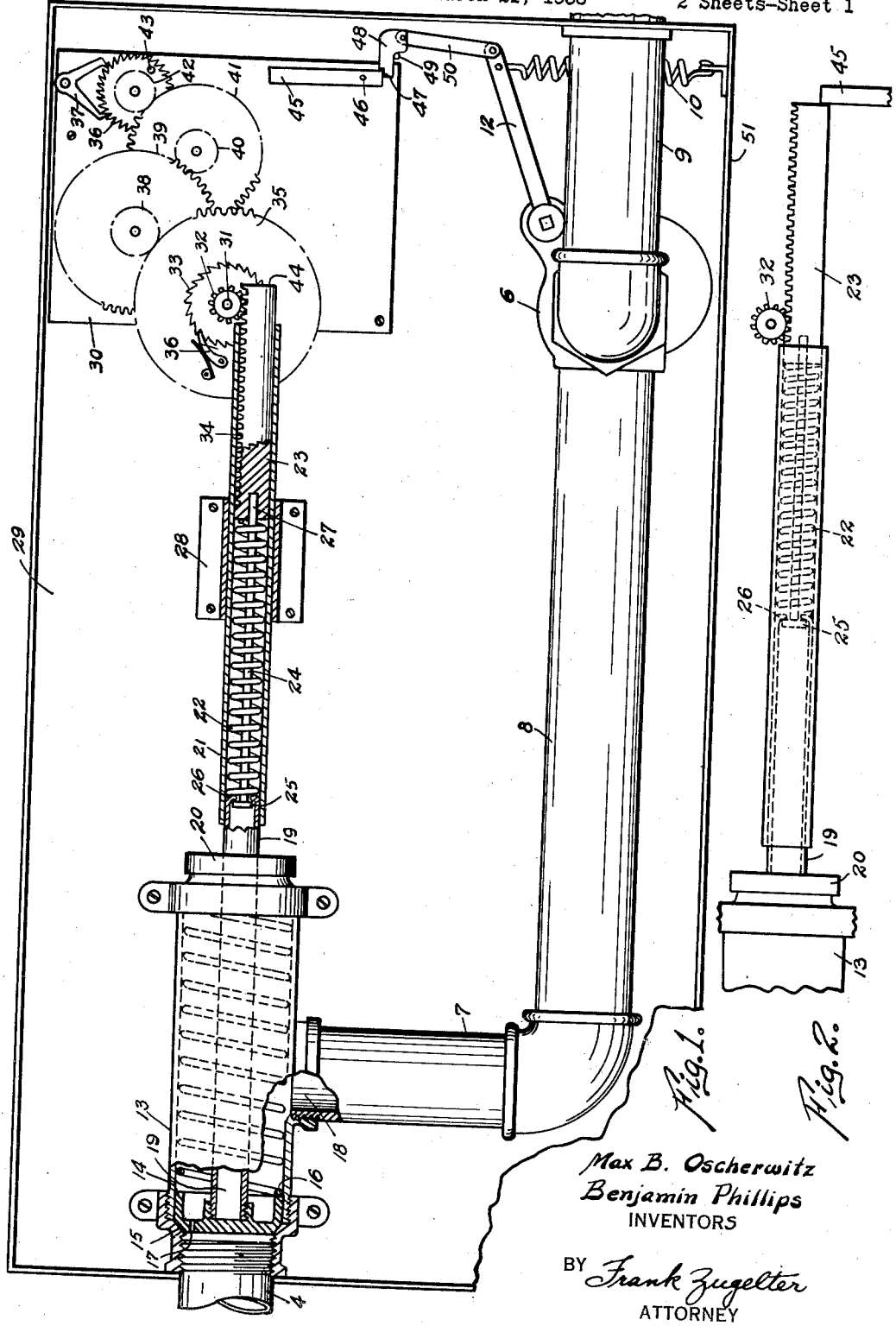
Max B. Oscherwitz
Benjamin Phillips
INVENTORS
BY Frank Zugelter
ATTORNEY Oct. 31, 1939.   M. B. OSCHERWITZ ET AL   2,177,784
AUTOMATIC CUT-OFF DEVICE
Filed March 21, 1938   2 Sheets-Sheet 2

Max B. Oscherwitz
Benjamin Phillips
INVENTORS

BY Frank Zugelter
ATTORNEY

Patented Oct. 31, 1939

2,177,784

UNITED STATES PATENT OFFICE 2,177,784

AUTOMATIC CUT-OFF DEVICE

Max B. Oscherwitz and Benjamin Phillips, Cincinnati, Ohio

Application March 21, 1938, Serial No. 197,085

6 Claims. (Cl. 137—139)

This invention relates to an automatic device for cutting off a supply of fluid in the event of continued leakage or wasteful or unreasonable use thereof. The device may be used for controlling the supply of any fluid under pressure, whether the fluid be a gas or a liquid; however, the most common application of the invention would be to the water supply systems of buildings, and especially tenement properties, wherein waste of water due to carelessness, leaks, damaged or imperfect fixtures and the like, oftentimes subjects the landlord or property manager to payment of excessively large water bills, before the waste or leakage can be detected.

An object of the invention is to provide a device which will automatically cut off the supply of fluid in the event of excessive consumption, or leakages, great or small extending beyond a predetermined period of time, so that a repairman may be called upon to investigate and correct any condition responsible for the waste of fluid before the cost thereof can mount to a high figure.

Another object of the invention is to furnish a device of the character stated, which will operate to cut off the supply of fluid, whether the leakage or waste be readily evident and visible, or concealed underground or elsewhere.

A further object of the invention is to furnish a device of the character and for the purpose stated, which is simple, inexpensive and trouble-free, so that its practicability in all respects is assured.

Another object of the invention is to provide an automatic cut-off device which will permit any reasonable fluid consumption intermittently, or continuously during intervals of time not in excess of a predetermined maximum, so as not to interfere with any normal or expected usage of the fluid.

The foregoing and other objects are attained by the means described herein and disclosed in the accompanying drawings, in which:

Fig. 1 is an elevational view showing the device of the invention encased, with parts broken away to disclose interior structure in cross-section.

Fig. 2 is a fragmental elevational view showing the device in position to effect a cut-off of fluid in a supply line.

Figure 3:
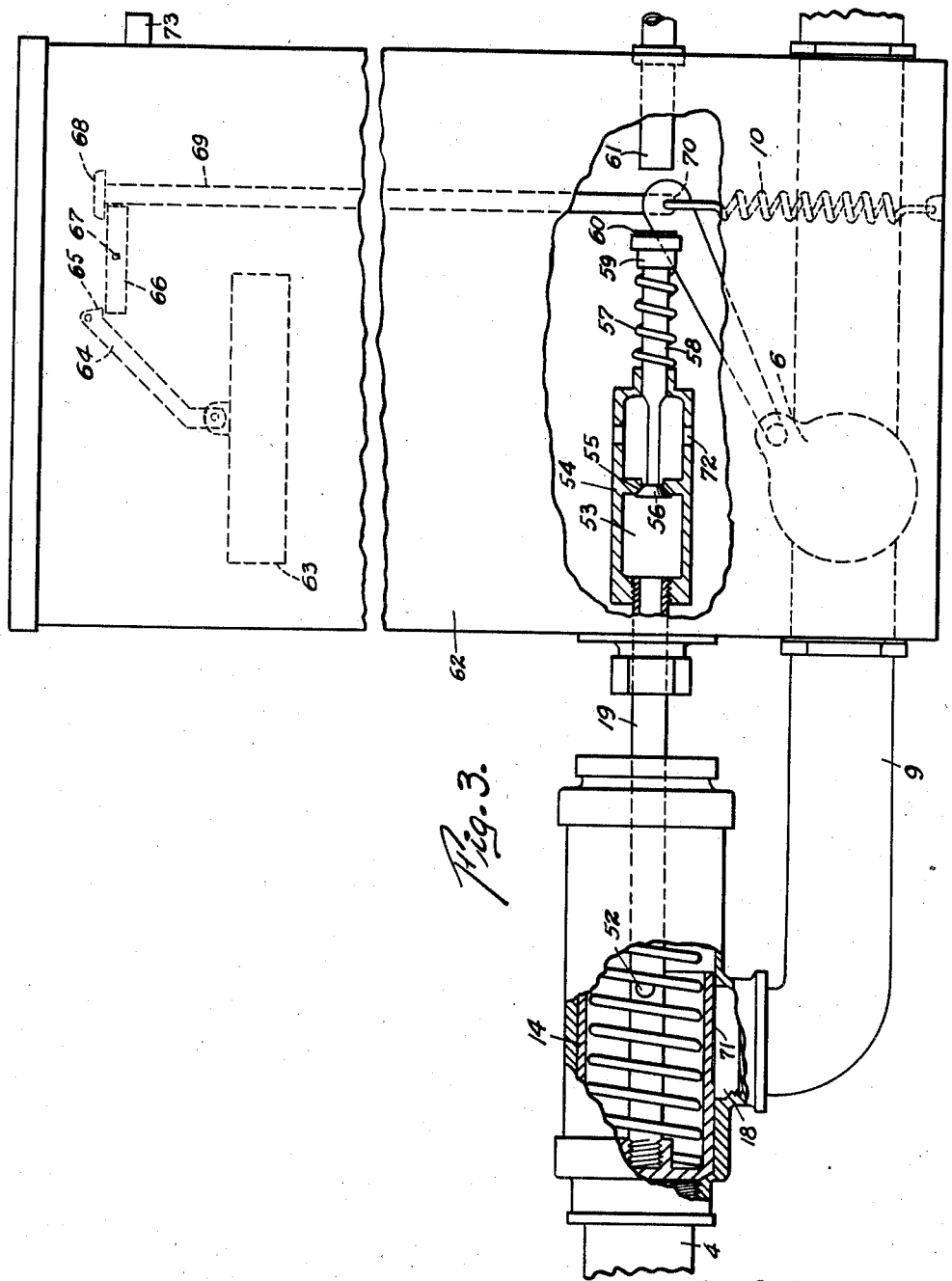
Fig. 3 is an elevational view, parts being broken away, showing a modification of the device of the invention.

With reference to the accompanying drawings, 4 indicates a fluid supply pipe leading from a main, and 6 indicates an emergency cut-off valve which is normally in open position to permit a flow of fluid from the supply pipe, and through sections 7, 8 and 9 thereof which lead to the plumbing fixtures or consuming means of a building. The valve 6 may be of self closing type, or it may be closed externally by means of spring 10 connected with the valve handle 12.

It will be noted that supply pipe 4 is in fluid communication with the device of the present invention, which comprises a valve body 13 in which a piston or plunger 14 is supported for reciprocating movement. The piston may seat upon an annular valve seat 15 of the valve body, and may be maintained normally in the seated position by means of the spring 16. The spring is of such force as to yield to the pressure of the fluid in the supply pipe 4 when the fluid is dispensed through the fixtures connected with pipes 7, 8 and 9. In other words, the spring will maintain the piston against the valve seat 15 when the fluid pressure at both sides of the piston is equalized. Equalization may be provided for by leakage past the piston, or by means of a bleeder or other suitable expedient 17.

By reference to Fig. 1 it will be readily understood that any fluid leaking from or withdrawn from the pipe 9 or any branches thereof, will effect movement of the piston 14 at least as far as the port 18 of valve body 13.

Attached to the piston or plunger 14 is a hollow shaft or piston rod 19, which extends through the rear of the valve body, for reciprocation through a fluid-tight packing gland structure 20.

Exteriorly of the valve body, rod or shaft 19 is surrounded by a cylindrical casing 21 which is fixed against movement with the rod 19, said casing furnishing a support for a compression spring 22, a rack 23 and a rack retractor element 24. The element 24 is encircled by the spring 22 and has a head 25 which may slide within the hollow interior of the piston rod 19. Suitable abutments 26 may be furnished to preclude the head 25 leaving the interior of the rod 19. The opposite end 27 of the retractor element is fixed to the rack 23 in any suitable manner, so that the retractor element and the rack move always in unison. The character 28 indicates a bracket for supporting the casing 21 upon the board or panel 29 which supports the valve casing 13.

The character 30 indicates generally a timing device of any suitable design, to be driven by the power of the compression spring 22 when the spring is placed under compression by the movement of piston 14 and its rod 19, resulting from a flow of fluid through the system comprising the pipes 4—7—8—9. As shown, the timing device comprises a main shaft 31 upon which are fixedly mounted the rack pinion 32 and the ratchet wheel 33. The pinion is always in driving engagement with the rack teeth 34, and rotation of the ratchet wheel is transmitted to a large gear 35 through the spring pressed pawl 36 mounted pivotally upon said gear, as shown. Movement of the gear 35 is transmitted to an escapement indicated at 36—37, through a train of gears 38, 39, 40, 41 and 42. The escapement may be furnished with any suitable means, for example the off-balance weight 43 to render the timing device self starting.

From the foregoing, it should be understood that movement of piston or plunger 14 to the right (Fig. 1) will compress the spring 22 for yieldingly urging the rack 23 toward the right. The rack, therefore, will drive the timing device, as the rack moves slowly to the right under the driving influence of the spring 22. The arrangement is such that a predetermined period of time, say two or three hours, will be required to dispose the rack to its limit of extension, where the leading end 44 of the rack will strike the trip lever 45 to effect closing of the emergency cut-off valve 6. While a particular means is illustrated for the purpose of tripping or releasing the emergency valve, it should be understood that any suitable arrangement may be employed. As shown, the trip lever 45 is pivoted at 46 and engages a step or shoulder 47 of a dog 48, fulcrumed at 49, and pivotally connected with the valve lever 12 by means of a link 50. By preference, the trip mechanism is so constructed that the emergency valve may not be reset to its normal open position without gaining access to the casing 51 which houses the entire mechanism. The fluid, therefore, is to be effectively shut off by the emergency valve until such time as an investigation can be performed by a repairman or other person authorized to reset the cut-off device.

Fig. 2 illustrates the operative position of the rack, for tripping the lever 45 and releasing the valve for a closing movement by means of the tension spring 10.

The operation of the device is as follows: Assuming that there is a leak in any part of the system controlled by the emergency cut-off valve, there will be a flow of fluid from the supply pipe 4 and through the pipes 7—8—9. This flow, of course, will unseat the piston 14 and move it to a position near the port 18. This movement of the piston will be transmitted through the piston rod 19 to the spring 22, and so long as the piston remains in the advanced unseated position aforesaid, the spring 22 will act upon the rack 23 for driving the timing device. The advancing movement of the rack toward the trip lever 45 will be governed by the timing device so that a period of time approximating two or three hours, or any other desired time interval, will be required for tripping the lever 45 and closing the emergency valve. The system, therefore, will be permitted to leak only for a period of time determined by the timing device.

In normal usage or consumption of fluid, the withdrawal from the system will be intermittent, and so long as the continuous withdrawal does not exceed the time period imposed by the timing device, the emergency valve will not operate to shut off the system. To further explain this situation, let it be assumed that the withdrawal of fluid occurs continuously for a period of one hour. In such a case, the piston will be unseated and the rack will drive the timing device as previously explained; however, as soon as the fluid withdrawal ceases, the piston will return to its seated position, and the rack will be immediately retracted by reason of the connection at 25—26 between the piston rod and the retractor element 24. Any subsequent withdrawal of fluid, then, will start the timing device from the very beginning of its running period. Accordingly, if the timing device be set to trip the emergency valve at the end of a two hour period, and fluid be withdrawn from the system for a period of time just short of the two hour period, and then terminated, the timing device will upon a subsequent withdrawal of fluid start at the beginning of another two hour period. Thus, any reasonable consumption of fluid from the system will not trip the emergency valve, but in the event of wasteful usage, a leak, or a faulty fixture permitting leakage, the emergency valve will operate to close off the supply.

The device just described may be conveniently mounted upon a panel 29 encased as shown to prevent access thereto by unauthorized persons. A timing device other than that illustrated may be employed and if desired, the timing device may have a regulating means such as is employed for regulating the speed of an ordinary clock, so that the timing period may be varied to accommodate various conditions and limits of individual fluid consumption.

In Fig. 3 is illustrated a modification of the device shown in Figs. 1 and 2, operating on a slightly different principle. In the Fig. 3 device, the elements which correspond with the elements of Fig. 1 bear similar reference numerals. In the Fig. 3 device, however, the hollow piston rod or shaft 19 is provided with a weep hole 52, so that the fluid under pressure entering behind the piston will flow through the hollow shaft and into a chamber 53 to which the free end of the piston rod is fixed. This chamber is part of an auxiliary valve body 54 having a seat 55 upon which a poppet valve 56 is normally seated. The valve 56 is yieldingly maintained upon its seat by means of spring 57 which encircles the stem 58 of the valve. One end of the spring abuts the valve body, while the other end abuts a head 59 of the exterior end of the valve stem. The head carries a suitable washer or plug 60 adapted to close the adjacent open end of a drain pipe 61. All of these elements are enclosed within a fluid tight tank or reservoir 62.

Enclosed within the tank also is the automatic cut-off valve 6 and its operating spring 10. The tank contains also a float 63 to be elevated by reason of a predetermined fluid level within the tank. The float is operatively connected to a link 64 having an overhanging end 65 which normally engages one end of a trip lever 66 pivoted as at 67. The opposite end of the trip lever supports the head 68 of a connecting rod 69, the lower end of which is pivoted to the valve handle at 70.

In the modified form of device disclosed in Fig. 3 a withdrawal of fluid from the pipe 9 will move the piston to a position adjacent to the port 18, thereby permitting leakage past the piston through a bleeder channel or the like 71, so that a small portion of the fluid under pressure will enter the weep hole 52 and chamber 53. In the advanced position of the piston, as stated, the entire valve structure within the tank will be moved toward the right, with the washer 60 in closing position against the adjacent end of the drain pipe 61. In this position of the washer, the auxiliary valve 56 will be displaced from its seat, and fluid entering through the hollow piston rod and chamber 53, will be directed into the tank through the opening 72. So long as the withdrawal of fluid continues without interruption, the tank will slowly fill; and when the level of fluid in the tank reaches an elevation sufficient to move the float 63, the over-hang 65 will release the trip lever 66, thereby permitting the spring 10 to close the automatic cut-off valve 6. The piston 14 thereupon will return to the normal position of Fig. 3, closing off the supply of the tank 62. Should the piston 14 leak slightly when in the closed position shown, any additional fluid entering the tank may be withdrawn through an over-flow tube or opening 73.

Under normal conditions of fluid withdrawal, the device of Fig. 3 will operate in substantially the manner described in connection with the device of Fig. 1, that is, each reseating of the piston 14 will withdraw the washer 60 from the drain opening 61, and thereby permit accumulated fluid to leave the tank. Thus, if fluid be consumed for a period of one hour continuously the tank may fill to the half-way point but as soon as the withdrawal is terminated, the accumulated fluid in the tank will leave through the drain pipe, whence it may be directed into a sewer or other means of disposal. It will accordingly be understood that in the Fig. 3 device the tank comprises the timing device which corresponds to the mechanical timer 39 of Fig. 1. By installing the device of the present invention in the water supply line of a building, for example, there is eliminated any excuse for abnormal water bills resulting from leaks, carelessness of usage, or faulty fixtures which may waste water over a period of weeks or months before the condition is brought to the attention of the repairman or the owner of the property. The device is simple and inexpensive and will operate for long periods of time without maintenance expense or mechanical trouble of any kind. The devices herein disclosed are considered superior to any device for accomplishing the purpose thereof electrically, for the reason that its use is not limited to localities wherein electrical power is available.

It is to be understood that various modifications and changes in the structural details of the device may be made, within the scope of the appended claims, without departing from the spirit of the invention.

What is claimed is:

1. A control apparatus for fluid under pressure, comprising in combination a supply pipe for the fluid, a normally open emergency shut-off valve interposed in the supply pipe, timing means having an operating period initiated by a flow of fluid through the supply pipe, means under the control of the timing means for closing the shut-off valve upon expiration of the aforesaid operating period of the timing means, means to extend the timing means operating period for delaying closing of the shut-off valve, upon each interruption to the flow of fluid in the pipe, and means isolating the shut-off valve from the timing means upon closing of said valve, to preclude restoration of a flow of fluid through the valve.

2. A control apparatus for fluid under pressure, comprising in combination a supply pipe for the fluid, a normally open emergency shut-off valve interposed in the supply pipe, a plunger subjected to the fluid pressure of the pipe and adapted to be advanced each time a flow occurs in the fluid pipe, a tank and a float therein controlling the emergency shut-off valve, means for slowly filling the tank with fluid while the plunger is advanced, to actuate the float and close the emergency shut-off valve, and means for exhausting the fluid from the tank between successive advancing movements of the plunger.

3. A control apparatus for fluid under pressure, comprising an elongated cylindrical valve body having an inlet port with a valve seat at one end of the valve body and an outlet port intermediate the ends of the valve body, and an outlet pipe through which fluid may be drawn from the outlet port, a normally open emergency shut-off valve for controlling the flow of fluid from the outlet pipe, a displaceable piston in the elongated cylindrical valve body adapted to normally seat upon the valve seat of said valve body, means yieldingly resisting fluid pressure displacement of the piston from the seat of the valve body toward the outlet port thereof, a piston rod extending axially of the elongated valve body for movement with the displaceable piston as the piston moves toward the outlet port when fluid is dispensed from the outlet pipe, a spring acted upon by the piston rod, and a driver in turn acted upon by the spring, whereby advancement of the piston rod compresses the spring and tends to yieldingly advance the driver, a timing device including means effecting a driving relationship thereof with the driver, whereby the rate of advancement of the driver by the spring, when the latter is placed under compression by the advancement of the piston rod, is governed and reduced with respect to the rate of advancement of the piston rod, and means operative upon expiration of a predetermined movement of the driver as controlled by the timing device, for effecting a closing movement of the normally open shut-off valve.

4. A control apparatus for fluid under pressure, comprising an elongated cylindrical valve body having an inlet port with a valve seat at one end of the valve body, and an outlet port intermediate the ends of the valve body, and an outlet pipe through which fluid may be drawn from the outlet port, a normally open emergency shut-off valve for controlling the flow of fluid from the outlet pipe, a displaceable piston in the elongated cylindrical valve body adapted to normally seat upon the valve seat of said valve body, means yieldingly resisting fluid pressure displacement of the piston from the seat of the valve body toward the outlet port thereof, a piston rod extending axially of the elongated valve body for movement with the displaceable piston as the piston moves toward the outlet port when fluid is dispensed from the outlet pipe, a spring acted upon by the piston rod, and a reciprocable driver in turn acted upon by the spring, whereby advancement of the piston rod compresses the spring and tends to yieldingly advance the driver, a timing device in driving relationship with the driver, whereby advancement of the driver by the spring placed under compression by advancement of the piston rod, is governed and reduced in speed, means for retracting the driver and normalizing the timing device upon each re-seating movement of the displaceable piston, whereby the resultant loss of the compressive force of the spring terminates the power source for the timing device, and means operative, upon expiration of a predetermined maximum movement of the driver established by the timing device, for effecting a closing movement of the normally open shut-off valve.

5. A control apparatus for fluid under pressure, comprising an elongated cylindrical valve body having an inlet port with a valve seat at one end of the valve body, and an outlet port intermediate the ends of the valve body, and an outlet pipe through which fluid may be drawn from the outlet port, a normally open emergency shut-off valve for controlling the flow of fluid from the outlet pipe, a displaceable piston in the elongated cylindrical valve body adapted to normally seat upon the valve seat of said valve body, means yieldingly resisting fluid pressure displacement of the piston from the seat of the valve body toward the outlet port thereof, a piston rod extending axially of the elongated valve body for movement with the displaceable piston as the piston moves toward the outlet port when fluid is dispensed from the outlet pipe, a spring acted upon by the piston rod, and a driver in turn acted upon by the spring, whereby advancement of the piston rod compresses the spring and tends to yieldingly advance the driver, a timing device governing the rate of advancement of the driver powered by the spring, and means actuated by the driver upon predetermined advancement thereof, for effecting a closing movement of the normally open shut-off valve.

6. A control apparatus for fluid under pressure, comprising in combination a supply pipe for the fluid, a normally open emergency shut-off valve interposed in the supply pipe, a plunger subjected to the fluid pressure of the pipe and adapted to be advanced each time a flow occurs in the fluid pipe, a tank and a float therein controlling the emergency shut-off valve, means for slowly filling the tank with fluid while the plunger is advanced, to actuate the float and close the emergency shut-off valve, means for exhausting the fluid from the tank between successive advancing movements of the plunger, and means isolating the shut-off valve from the controlling influence of the float upon closing of said valve, to preclude restoration of a flow of fluid through the valve.

MAX B. OSCHERWITZ.
BENJAMIN PHILLIPS.